United States Patent
Ballard

(10) Patent No.: US 10,479,922 B2
(45) Date of Patent: Nov. 19, 2019

(54) SET ON DEMAND COMPOSITIONS

(71) Applicant: M-I Drilling Fluids U.K. Limited, Aberdeenshire, Scotland (GB)

(72) Inventor: David Anthony Ballard, Aberdeenshire (GB)

(73) Assignee: M-I Drilling Fluids U.K. Limited, Aberdeen (GB)

( * ) Notice: Subject to any disclaimer, the term of this patent is extended or adjusted under 35 U.S.C. 154(b) by 0 days.

(21) Appl. No.: 15/323,301

(22) PCT Filed: Jul. 2, 2014

(86) PCT No.: PCT/EP2014/064120
§ 371 (c)(1),
(2) Date: Dec. 30, 2016

(87) PCT Pub. No.: WO2016/000772
PCT Pub. Date: Jan. 7, 2016

(65) Prior Publication Data
US 2017/0130115 A1    May 11, 2017

(51) Int. Cl.
*C04B 28/02* (2006.01)
*E21B 33/14* (2006.01)
(Continued)

(52) U.S. Cl.
CPC .............. *C09K 8/467* (2013.01); *C04B 14/04* (2013.01); *C04B 24/16* (2013.01); *C04B 24/2652* (2013.01); *C04B 28/02* (2013.01); *C04B 28/30* (2013.01); *C04B 28/32* (2013.01); *C09K 8/426* (2013.01); *C09K 8/428* (2013.01); *E21B 33/14* (2013.01); *C04B 2103/40* (2013.01)

(58) Field of Classification Search
None
See application file for complete search history.

(56) References Cited

U.S. PATENT DOCUMENTS 2,890,752 A    6/1959    Crone et al.
3,359,225 A *  12/1967   Weisend ................. C04B 28/04
                                                    524/160
(Continued)

FOREIGN PATENT DOCUMENTS

CA    2183489 A1    2/1998
CA    2407640 A1    11/2001
(Continued)

OTHER PUBLICATIONS

International Search Report issued in PCT/EP2014/064120 dated Nov. 5, 2014 (3 pages).
(Continued)

*Primary Examiner* — Anuradha Ahuja
(74) *Attorney, Agent, or Firm* — David J. Smith

(57) ABSTRACT

Cement compositions may contain a cement component and an oil-immiscible solvent and used in a number of cementing applications. In another aspect, methods for sealing subterranean zones may include emplacing a cement composition into a wellbore containing a cement component and an oil-immiscible solvent, contacting the cement composition with a water source, and reacting the cement composition with the water source to form a hardened cement.

9 Claims, 2 Drawing Sheets

(51) Int. Cl.
*C09K 8/467* (2006.01)
*C09K 8/42* (2006.01)
*C04B 28/32* (2006.01)
*C04B 14/04* (2006.01)
*C04B 24/16* (2006.01)
*C04B 24/26* (2006.01)
*C04B 28/30* (2006.01)
*C04B 103/40* (2006.01)

(56) References Cited

U.S. PATENT DOCUMENTS

| | | | | |
|---|---|---|---|---|
| 3,493,529 | A * | 2/1970 | Eilers | C04B 28/065 166/293 |
| 3,866,683 | A * | 2/1975 | Maly | C09K 8/42 166/291 |
| 4,487,529 | A * | 12/1984 | Douty | E21D 20/021 106/713 |
| 5,565,026 | A * | 10/1996 | Hense | C04B 28/006 106/600 |
| 5,658,480 | A | 8/1997 | Tennant et al. | |
| 6,616,751 | B1 * | 9/2003 | Maroy | C04B 24/00 106/696 |
| 2002/0162657 | A1 * | 11/2002 | Tumlin | E21B 33/134 166/285 |
| 2004/0211339 | A1 * | 10/2004 | Reddy | C04B 24/287 106/691 |
| 2004/0221990 | A1 * | 11/2004 | Heathman | C04B 22/04 166/292 |
| 2005/0193791 | A1 * | 9/2005 | Petrea | A01G 1/002 71/11 |
| 2008/0006404 | A1 | 1/2008 | Reddy et al. | |
| 2008/0146688 | A1 * | 6/2008 | Glos | C08G 18/409 521/110 |
| 2008/0308275 | A1 * | 12/2008 | Brothers | C04B 28/02 166/295 |
| 2010/0319918 | A1 * | 12/2010 | Spangle | C04B 28/02 166/285 |
| 2011/0136943 | A1 * | 6/2011 | James | C04B 18/022 524/5 |
| 2012/0073813 | A1 * | 3/2012 | Zamora | C04B 28/02 166/285 |
| 2012/0285692 | A1 * | 11/2012 | Potapenko | E21B 21/003 166/308.1 |
| 2013/0000904 | A1 | 1/2013 | Scoggins | |
| 2013/0299170 | A1 | 11/2013 | Joseph et al. | |
| 2014/0076561 | A1 * | 3/2014 | Reddy | C04B 28/32 166/293 |

FOREIGN PATENT DOCUMENTS

| | | |
|---|---|---|
| EP | 0254342 A2 | 1/1998 |
| EP | 1309522 B1 | 10/2009 |
| WO | 2002/38517 A2 | 5/2002 |
| WO | 2006/021792 A2 | 3/2006 |
| WO | 2008/084193 A2 | 7/2008 |
| WO | 2009/016230 A2 | 2/2009 |
| WO | 2013/002901 A1 | 1/2013 |
| WO | 2013/169533 A1 | 11/2013 |

OTHER PUBLICATIONS

Written Opinion of the International Searching Authority issued in PCT/EP2014/064120 dated Nov. 5, 2014 (6 pages).
International Preliminary Report on Patentability for the equivalent PCT/EP2014/064120 dated Jan. 12, 2017 (8 pages).
Joel Ogbonna F., "The Secondary Effects of Lignosulfonate Cement Retarder on Cement Slurry Properties,"ARPN Journal of Engineering and Applied Sciences, vol. 4, No. 9, Nov. 2009; pp. 1-7 (7 pages).

* cited by examiner

SET ON DEMAND COMPOSITIONS

CROSS-REFERENCE TO RELATED APPLICATIONS

This application is a national stage application of PCT/EP2014/064120 filed on Jul. 2, 2014.

BACKGROUND

During the drilling of a wellbore, various fluids are used in the well for a variety of functions. The fluids may be circulated through a drill pipe and drill bit into the wellbore and then may subsequently flow upward through wellbore to the surface. Wellbore fluids used during drilling may act to lubricate and cool rotary drill bits, prevent blowouts by providing hydrostatic pressure to balance any high-pressure formation fluids that may suddenly enter the wellbore, and remove cuttings from the wellbore.

Following the drilling of a wellbore, completions operations may involve placing a pipe string or casing to line the well. Well casings of various sizes may be used, depending upon depth, desired hole size, and geological formations encountered. The casing may serve several functions, including providing structural support to the wellbore to prevent the formation walls from caving into the wellbore. The casing may, in some instances, be stabilized and bonded in position within the wellbore. However, because drilling fluids are generally not settable, a portion of the drilling fluid may be removed from the wellbore so that the casings may be set in place by a primary cementing operation. Before cementing operations commence, engineers may determine the volume of cement to be placed in the wellbore (often with the help of a caliper log) and the physical properties of the cement needed, including density and viscosity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to cement compositions containing a cement component; an oil-immiscible solvent; a surfactant; and hydration retarders selected from a group that includes polycarboxylate polymers, polycarboxylic acids, lignosulfonates, sulfonated tannins, and chelators.

In another aspect, embodiments disclosed herein are directed to methods for sealing a subterranean zones that include emplacing a cement composition into a wellbore containing: a cement component, an oil-immiscible solvent; a surfactant; and hydration retarders selected from a group that includes polycarboxylate polymers, polycarboxylic acids, lignosulfonates, sulfonated tannins, and chelators; contacting the cement composition with a formation water; and reacting the cement composition with the formation water to form a hardened cement.

In yet another aspect, embodiments disclosed herein are directed to methods for sealing a subterranean zone that include: emplacing a cement composition into a wellbore that contains a cement component; an oil-immiscible solvent; a surfactant; hydration retarders selected from a group that includes of polycarboxylate polymers, polycarboxylic acids, lignosulfonates, sulfonated tannins, and chelators; and a latent curing agent; releasing an aqueous fluid stored in the latent curing agent; and reacting the cement composition with the aqueous fluid released from the latent curing agent to form a hardened cement.

Other aspects and advantages of the embodiments disclosed herein will be apparent from the following description and the appended claims.

DETAILED DESCRIPTION

Figure 1:
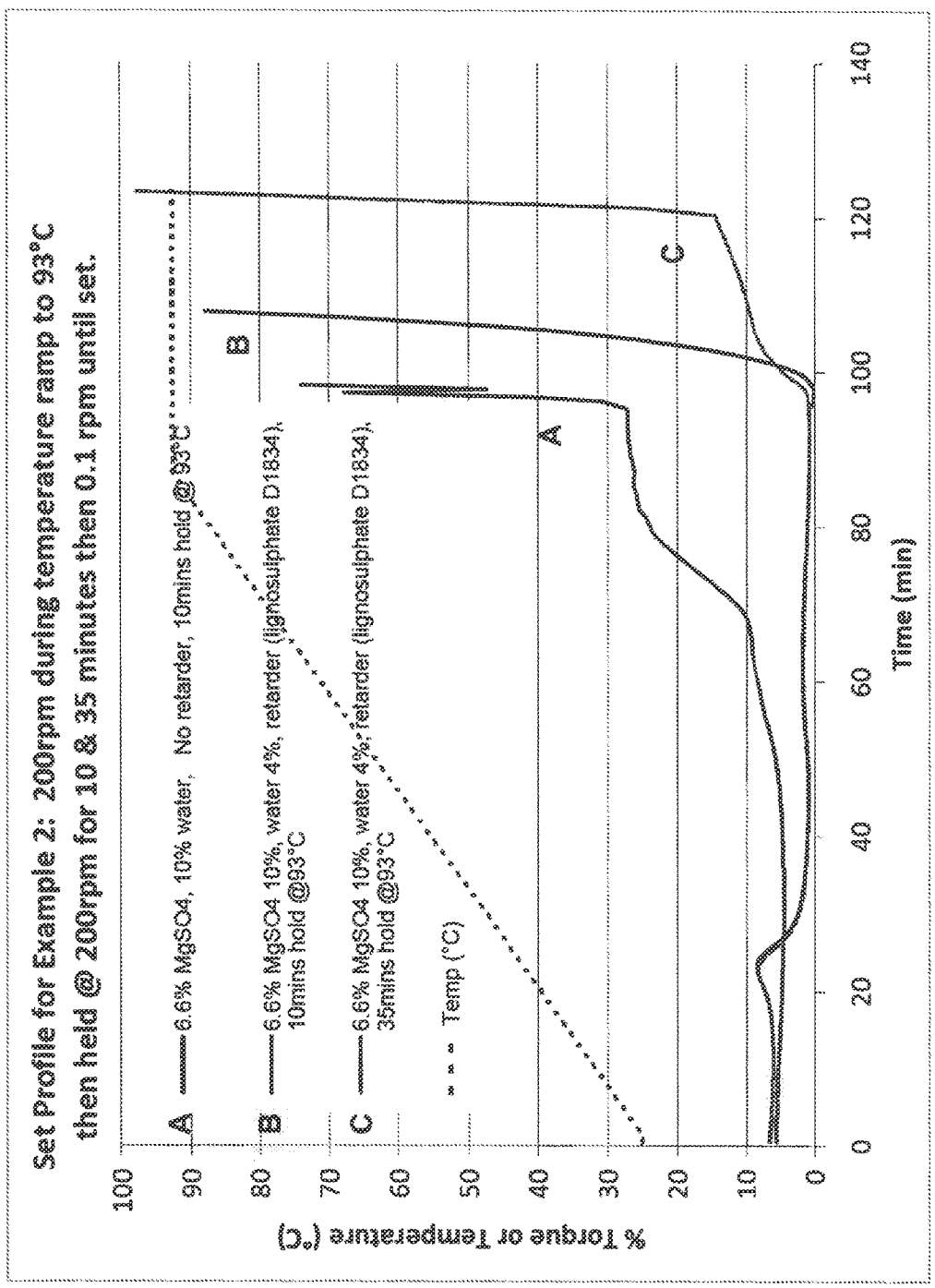
FIG. 1 is an illustration of the hardness profile as a function of applied water and hydration retarder for cement compositions in accordance with embodiments described herein.

In one aspect, embodiments disclosed herein relate to set on demand compositions that may be used for cementing applications, including primary cementing operations, lost circulation, and zonal isolation, etc. In one or more embodiments, a cement composition containing a cement component that hardens or sets when exposed to water is suspended in a non-aqueous solvent or combination of non-aqueous solvents. Because the solvent is non-aqueous, hydration of the cement component is suspended or delayed, which may allow cement compositions to penetrate weakly consolidated formations and crevices before curing or setting. Once in place, the presence of increased temperature and aqueous fluids cause the cement component of the composition to hydrate and set. Cement compositions disclosed herein may enable better control during cementing operations such as primary cementing and spot or squeeze treatments.

As will be shown, cement compositions in accordance with the present disclosure may find utility in other wellbore operations in which zonal isolation may be beneficial. For example, one method to increase the production of a well is to perforate the well in a number of different locations, either in the same hydrocarbon bearing zone or in different hydrocarbon bearing zones, and thereby increase the flow of hydrocarbons into the well. The problem associated with producing from a well in this manner relates to the control of the flow of fluids from the well and to the management of the reservoir. For example, in a well producing from a number of separate zones (or from laterals in a multilateral well) in which one zone has a higher pressure than another zone, the higher pressure zone may disembogue into the lower pressure zone rather than to the surface. Similarly, in a horizontal well that extends through a single zone, perforations near the "heel" of the well, i.e., nearer the surface, may begin to produce water before those perforations near the "toe" of the well. The production of water near the heel reduces the overall production from the well.

Cement Components

The present disclosure is directed to hydraulic cement compositions having controllable set times and methods of preparing and using such compositions. In particular embodiments, cement compositions may include a cement component that reacts with a downhole water source and hardens to form a barrier that prevents the flow of gases or liquids within a wellbore traversing an oil or gas reservoir.

Cement compositions in accordance with embodiments disclosed herein may incorporate a magnesium-based cement such as a "Sorel" cement. Magnesium-based cements are fast setting cements that approach maximum strength within 24 hours of contact with water. While not limited by any particular theory, the cement-forming reaction mechanism is thought to be an acid-base reaction between a magnesium oxide, such as MgO, and available aqueous salts. For example, mixing solid MgO and a brine containing $MgCl_2$ results in an initial gel formation followed by the crystallization of the gel into an insoluble cement matrix, producing magnesium oxychloride (MOC) cement. Other magnesium-based cements may be formed from the reaction of magnesium cations and a number of counter anions such as, for example, halides, phosphates, sulfates, silicates, aluminosilicates, borates, and carbonates. In some embodiments, anions may be provided by a magnesium salt of the selected anion.

In addition to MOC cements, prominent examples of magnesium-based cements also include magnesium oxysulfate (MOS) cements formed by the combination of magnesium oxide and a magnesium sulfate solution), and magnesium phosphate (MOP) cements formed by the reaction between magnesium oxide and a soluble phosphate salt, such as ammonium phosphate ($NH_4H_2PO_4$). Other suitable magnesium cements may also include magnesium carbonate and magnesium silicate cements. In one or more embodiments, magnesium cements may also include combinations of any magnesium cements described herein and those known in the art.

In other embodiments, the cement composition may be selected from hydraulic cements known in the art, such as those containing compounds of calcium, aluminum, silicon, oxygen and/or sulfur, which set and harden by reaction with water. These include "Portland cements," such as normal Portland or rapid-hardening Portland cement, sulfate-resisting cement, and other modified Portland cements; high-alumina cements, high-alumina calcium-aluminate cements; and the same cements further containing small quantities of accelerators or retarders or air-entraining agents. Other cements may include phosphate cements and Portland cements containing secondary constituents such as fly ash, pozzolan, and the like. Other water-sensitive cements may contain aluminosilicates and silicates that include ASTM Class C fly ash, ASTM Class F fly ash, ground blast furnace slag, calcined clays, partially calcined clays (e.g., metakaolin), silica fume containing aluminum, natural aluminosilicate, feldspars, dehydrated feldspars, alumina and silica sols, synthetic aluminosilicate glass powder, zeolite, scoria, allophone, bentonite and pumice.

In one or more embodiments, the set time of the cement composition may be controlled by, for example, varying the grain size of the cement components, varying the temperature of the composition, or modifying the availability of the water from a selected water source. In other embodiments, the exothermic reaction of components included in the cement composition (e.g., magnesium oxide, calcium oxide) may be used to increase the temperature of the cement composition and thereby increase the rate of setting or hardening of the composition.

Cement compositions in accordance with the present disclosure may also include a variety of inorganic and organic fillers that may become entrained as the cement composition sets, which may modify the density, plasticity, and hardness of the final cement. Suitable fillers may include, for example, saw dust, wood flour, cork, stones, marble flour, sand, glass fibers, mineral fibers, and gravel.

In one or more embodiments, cement compositions in accordance with this disclosure may contain a cement component at a percent by weight (wt %) concentration having a lower limit equal or greater than 5 wt %, 7 wt %, 10 wt %, and 15 wt %, to an upper limit of 15 wt %, 20 wt %, 30 wt %, 50 wt %, and 60 wt %, where the wt % concentration of cement component, or combinations thereof, may range from any lower limit to any upper limit.

In one or more embodiments, cement compositions (as emplaced in the well) in accordance with this disclosure are substantially free of water (or accessible water). In other embodiments, cement compositions in accordance with this disclosure contain less than 15% water by volume, or less than 10%, 5%, 3%, or 2% water in yet other embodiments.

Hydration Retarders

In some embodiments, a cement component may be used in conjunction with set retarders known in the art to increase the workable set time of the resulting cement. Hydration retarders in accordance with the present disclosure may delay setting time and take into account increased temperatures encountered in many subterranean formations, allowing greater control of cement placement in a number of varied formations and conditions. For example, cement compositions in some embodiments may remain liquid and mobile for extended periods of time relative to control compositions at temperatures up to about 140° C.

While acceleration of cement hydration may be accomplished by modifying the aqueous phase of a cement composition in some embodiments, hydration retarders may also be used to modify the setting process. Hydration retarders may also increase the durability of a cement composition in some embodiments by reducing reaction kinetics and encouraging thermodynamic crystallization of cement components, minimizing crystal defects in the final cement product.

Hydration retarders in accordance with the present disclosure may serve several purposes such as to adjust the set profile of a cement composition and/or improve strength and hardness of the cement. Without being limited by a particular theory, retarders may operate by interacting with cement components through ionic interactions that prevent the cement components from agglomerating and incorporating into the matrix of the setting cement. Other possible chemical mechanisms may include reducing the rate of hydration by physically coating the unhydrated cement particles with hydration retarders and preventing water access.

In one or more embodiments, hydration retarders may include polymeric crystal growth modifiers having functional groups that stabilize cement components in solution and slow the formation of the cement matrix. For example, hydration retarders may include natural and synthetic polymers containing carboxylate or sulfonate functional groups, polycarboxylate polymers such as polyaspartate and polyglutamate, lignosulfonates, and polycarboxylic compounds such as citric acid, polyglycolic acid. Other suitable polymers may include sodium polyacrylates, polyacrylic acid, acrylic acid-AMPS-methylpropane sulfonic acid copolymers, polymaleic acid, polysuccinic acid, polysuccinimide, and copolymers thereof. In particular embodiments, hydration retarders may include polycarboxylic compounds available under the trade name BAYPURE® including DS 100 and CX 100, supplied by Lanxess, GmbH (Baytown, Tex.).

Hydration retarders may also include compounds that interrupt cement hydration by chelating polyvalent metal ions and forming hydrophilic or hydrophobic complexes with cement components. In one or more embodiments, hydration retarders may include one or more polydentate chelators that may include, for example, ethylenediaminetetraacetic acid (EDTA), diethylenetriaminepentaacetic acid (DTPA), citric acid, nitrilotriacetic acid (NTA), ethylene glycol-bis(2-aminoethyl)-N,N,N',N'-tetraacetic acid (EGTA), 1,2-bis(o-aminophenoxy)ethane-N,N,N',N'-tetraaceticacid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), iminodisuccinic acid, ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), salts thereof, and mixtures thereof.

In other embodiments, hydration retarders may include sulfonated phenolic and polyphenolic compounds such as lignosulfonates and sulfonated tannins, organophosphates, amine phosphonic acids, hydroxycarboxylic acids, and sulfonated and/or carboxylated derivatives of carbohydrates and sugars. Other hydration retarders may include boric acid, borax, sodium pentaborate, sodium tetraborate, and proteins such as whey protein.

In one or more embodiments, cement compositions in accordance with this disclosure may contain a hydration retarder at a percent by weight (wt %) concentration having a lower limit equal or greater than 0.1 wt %, 0.5 wt %, 1 wt %, and 1.5 wt %, to an upper limit of 1.5 wt %, 2 wt %, 5 wt %, 10 wt %, and 20 wt %, where the wt % of the hydration retarder, or combination of hydration retarders, may range from any lower limit to any upper limit.

Non-Aqueous Solvent System

In one or more embodiments, the suspension of the cement composition in a non-aqueous solvent may allow for control of the set time of the cement composition such that the cement composition is able to permeate into formation and react with water present in formation fractures and pores.

Non-aqueous solvents in accordance with the present disclosure include low molecular weight polar solvents that are immiscible in oil and, in particular embodiments, immiscible in mineral oils and diesel. In one or more embodiments, the non-aqueous solvent may be selected from, for example, glycol-derived compounds such as monoethylene glycol, diethylene glycol, diethylene glycol monomethyl ether, diethylene glycol monoethyl ether, monopropylene glycol, dipropylene glycol, glycerol, triethylene glycol, and the like. In some embodiments, the viscosity of a non-aqueous solvent such as those listed above may be modified through combination with a one or more low molecular weight alcohols that include methanol, ethanol, propanol, isopropanol, isobutanol, butanol, and the like, to aid in dispersion of materials into the non-aqueous solvent and to increase pumpability of the cementing composition.

In one or more embodiments, cement compositions in accordance with this disclosure may contain one or more non-aqueous solvents at a percent by volume (vol %) concentration having a lower limit equal or greater than 10 vol %, 20 vol %, 25 vol %, 30 vol %, 40 vol %, and 50 vol %, to an upper limit of 35 vol %, 50 vol %, 60 vol %, 70 vol %, and 80 vol %, where the vol % concentration of the non-aqueous solvent, or combinations thereof, may range from any lower limit to any upper limit.

Ionic Polymers

In embodiments of the present disclosure, ionic polymers may be added to provide additional strength and stability to the cement composition. Before the cement cures, ionic polymers may coat the surfaces of pre-cement particles present in the cement composition, decreasing the tendency of these particles to flocculate and settle and increasing overall dispersibility. During curing, ionic polymers may react with multivalent cations present in the cement composition or formation waters to form inter- and intra-strand crosslinks that incorporate with the forming cement, resulting in harder and more durable cement.

In one or more embodiments, the ionic polymer additive may be selected from polymers, copolymers, block copolymers, and higher order polymers (e.g., terpolymers, quaternary polymers, etc.) that are composed of one or more ionic monomers selected from alkenoic acids such as acrylic acid, itaconic acid and maleic acid; sulfonated monomers such as acrylamido-2-methyl-propane sulfonic acid, styrene sulfonic acid; phosphorylated monomers such as vinyl phosphonic acid, (1-amino-2-propenyl)phosphonic acid, styrene phosphonic acid, vinyl benzyl phosphonate; other water-miscible or water-soluble acrylates and methacrylates such as 2-hydroxyethyl methacrylate, hydroxymethyl methacrylate, 2-hydroxypropyl methacrylate, tetrahydrofurfuryl methacrylate, glycerol mono- or di-methacrylate, trimethylol propane trimethacrylate, ethylene glycol dimethacrylate, polyethylene glycol dimethacrylate, urethane methacrylates, alkyl acrylates, and the like. Other non-ionic monomers that may be incorporated as comonomers with any of the above ionic monomers include, but are not limited to, ethylene, propylene, styrene, alphamethyl styrene, t-butylstyrene, p-methylstyrene, acrylamide, methacrylamide, methylene bis-acrylamide, diacetone acrylamide, diacetone methacrylamide, and the like. In particular embodiments, the ionic polymer may be an ionomer such as CARBOSPERSE™ polymers commercially available from Lubrizol (Wickliffe, Ohio), VERSAFLEX® Si from Akzo Nobel (Chicago, Ill.), ACUMER® 5000 from Dow Chemical Company (Ringgold, La.), and FLOSPERS® available from SNF S.A.S. (Andrézieux, FRANCE).

In one or more embodiments, cement compositions in accordance with this disclosure may contain an ionic polymer additive at a percent by weight (wt %) concentration having a lower limit equal or greater than 0.5 wt %, 1 wt %, 1.5 wt %, 2.5 wt %, 3 wt %, and 5 wt %, to an upper limit of 0.75 wt %, 1 wt %, 3 wt %, 5 wt %, 7 wt %, and 10 wt %, where the wt % concentration of ionic polymer additive, or combinations thereof, may range from any lower limit to any upper limit.

In one or more embodiments, cement compositions in accordance with this disclosure may contain an ionic polymer additive having a molecular weight having a lower limit equal or greater than 0.5 kDa, 1 kDa, 2.5 kDa, 5 kDa, 15 kDa, and 30 kDa to an upper limit of 5 kDa, 7 kDa, 10 kDa, 15 kDa, 25 kDa, and 50 kDa where the molecular weight of ionic polymer additive, or combinations thereof, may range from any lower limit to any upper limit.

Non-ionic Polymers

In one or more embodiments, cement compositions may also include non-ionic polymers to increase the stability of the cement suspension. For example, non-ionic polymers may be used to stabilize the suspension for storage purposes though by acting as a steric stabilizer that prevents cement components from aggregating and settling out of suspension. Further, non-ionic polymers may improve strength and stability by incorporating into the cement matrix In one or more embodiments, non-ionic polymers compatible with the non-aqueous carrier fluid may stabilize the cement composition in solution prior to contacting a water source and initiating cement hydration. In particular embodiments, non-ionic polymers may include polyvinylpyrrolidone, copolymers and terpolymers containing vinylpyrrolidone and mixtures of one or more monomers such as alkylated vinylpyrrolidone, vinylacetate, acrylate, acrylamide, alkylaminomethacrylate, alkylaminomethacrylamide, styrene, dimethylaminoethylmethacrylate, methacrylamidopropyl trimethylammonium halide, dimethylaminopropylmethacrylamide, methacryloylaminopropyl lauryl dimethyl ammonium halide, lauryl methacrylate, vinylcaprolactam, and hydroxyethylmethacrylate. In one or more embodiments, the non-ionic polymer may be selected from PVP K90, commercially available from Sigma Aldrich (St. Louis, Mo.).

Depending on the application, polymers may include synthetic polymers that resist degradation over time, and in some instances, under high temperature/high pressure conditions (HTHP). Thermal and pressure stable polymers may include for example polymers, copolymers, block copolymers, and higher order copolymers (i.e., a terpolymer or quaternary polymer, etc.) composed of monomers that may include 2-acrylamido-2-methylpropanesulfonate, acrylamide, methacrylamide, N,N dimethyl acrylamide, N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, and poly(2-ethyl-2-oxazoline).

In other embodiments, the non-ionic polymer may also contain carboxylic anhydride functional groups that hydrolyze upon contact with aqueous fluids, "activating" the polymer, such that it can interact with ions present in the cement component. For example, polyanhydrides such as polysuccinimide and polymaleic anhydride may stabilize the cement composition during storage and, upon exposure to an aqueous environment, then hydrolyze to form a polycarboxylate polymer that may act as a hydration retarder in some embodiments. Other hydrolyzable polymers may include polymaleic anhydride, polymaleic esters, copolymers or terpolymers of vinyl maleic anhydride with other monomers such as isobutylene, hydroxyethylmaleimide, methylvinylether, acrylamide, acrylate, and the like. In one or more embodiments, the non-ionic polymer may be ISOBAM™ commercially available from Kuraray Co., Ltd. (Houston, Tex.), or Viviprint® and Ganex® polymers commercially available from International Specialty Products, Inc. (Texas City, Tex.).

Surfactants

Cement compositions of the instant disclosure may include one or more surfactants that may stabilize cement components in solution, preventing premature aggregation and setting of the cement. In one or more embodiments, the surfactant may be anionic surfactants such as alpha olefin sulfonates, alkane sulfonates, alkyl aryl sulfonates, secondary alkane sulfonates, alkyl methyl ester sulfonates, alkyl ether sulfates, alkyl sulfates, and alcohol sulfates. In one or more embodiments, the surfactant may be one of the HOSTAPUR™ series surfactants commercially available from Clariant Corp. (Spring, Tex.).

In other embodiments, suitable surfactants may be anionic surfactants represented by the chemical formula: $R^1CON(R^2)CH_2XR^3$ wherein $R^1$ is a hydrophobic chain having about 12 to about 24 carbon atoms, $R^2$ is hydrogen, methyl, ethyl, propyl, or butyl, and X is carboxyl, phosphoryl, or sulfonyl, and $R^3$ is hydrogen or a counterion produced from an alkali or alkaline metal, ammonium, or tetraalkyl ammonium. The hydrophobic chain can be an alkyl group, an aromatic group, an alkenyl group, an alkyl, an arylalkyl, or an alkoxyalkyl group. Examples of a hydrophobic chain include tetradecyl, hexadecyl, octadecentyl, octadecyl, docosenoic, and the like.

In yet other embodiments, suitable surfactants may include fatty acid derivatives derived through esterification of a $C_{12}$ to $C_{22}$ fatty acid with at least one mono-, di-, tri-, or polyol; phosphate esters; acetylene diols; and lecithins, including soya lecithin with or without naturally associated phosphatides, as well as lecithin derived from egg yolk and other sources.

In one or more embodiments, one or more surfactants may be incorporated into a cement composition at a percent by weight (wt %) that may range from any lower limit selected from the group of 0.1 wt %, 0.3 wt %, 0.5 wt %, 0.75 wt %, and 1 wt % to any upper limit selected from the group of 0.5 wt %, 1%, 2 wt %, 2.5 wt %, and 3.5 wt %.

Particulate Silica

Cement compositions of the present disclosure may also include a particulate silica additive. The methods used to prepare particulate silicas may alter many of the morphological characteristics of the final particulate silica product. For example, particulate silicas that may be used in cement compositions in accordance with the present disclosure include fumed or pyrogenic silicas, which are non-porous, water-insoluble, have a low bulk density, high surface area, and are compatible with aqueous and invert emulsion fluid systems.

Particulate silicas may also be selected from precipitated silicas prepared, for example, from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The choice of agitation, duration of precipitation, the addition rate of reactants, temperature, concentration, and pH may vary the properties of the resulting silica particles. Other types of particulate silica include ground silicas or silica flour produced by grinding or cocomminution of a silica with a pin mill or an air-jet mill.

In some embodiments, particulate silicas suitable for incorporation into cement compositions in accordance with embodiments disclosed herein may be selected from commercially available silicas that include AEROSIL® COK 84, AEROSIL® 200, which are commercially available from Evonik Degussa Corporation (Piscataway, N.J.); and D66 and D30 ground silicas from Schlumberger (Houston, Tex.).

Particulate silicas useful in embodiments herein may include finely-divided particulate solid materials, such as powders, silts, or sands, as well as reinforced flocs or agglomerates of smaller particles of siliceous material. In some embodiments, the particulate silica (or agglomerates thereof) may have an average particle size ($D_{50}$) of less than 100 microns; less than 50 microns in other embodiments; and in the range from about 1 micron to about 40 microns, such as about 25 to about 35 microns, in yet other embodiments. In still other embodiments, the average particle size for particulate silicas can vary from 10 nm to 150 nm; or 20 to 100 nm. Particulate silicas having a larger initial average particle size may be used, where shear or other conditions may result in comminution of the particles, such as breaking up of agglomerates, resulting in a silica particle having a useful average particle size.

In one or more embodiments, cement compositions in accordance with this disclosure may contain a particulate silica at a percent by weight (wt %) concentration having a lower limit equal or greater than 0.01 wt %, 0.05 wt %, 0.1 wt %, 0.5 wt %, 1 wt %, and 5 wt %, to an upper limit of 0.5 wt %, 1 wt %, 5 wt %, 7 wt %, and 10 wt %, where the wt % concentration of particulate silica, or combinations thereof, may range from any lower limit to any upper limit.

Other Additives

The fluids of the present disclosure may further contain additional chemicals depending upon the end use of the invert emulsion. For example, organophilic clays, viscosifiers, rheological modifiers, weighting agents, and bridging agents may be added to the fluid compositions of this disclosure for additional functional properties. The addition of such agents should be well known to one of skill in the art of formulating drilling fluids and muds. However, it should be noted that the addition of such agents should not adversely interfere with the properties associated with the cement composition's ability to solidify as described herein.

Organophilic clays, such as amine treated clays, may be useful as viscosifiers in the fluid compositions of the present disclosure. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight is a sufficient range for most applications. VG69™ and VG-PLUS™ are organoclay materials distributed by M-I L.L.C., and Versa-HRP™ is a polyamide resin material manufactured and distributed by M-I L.L.C., that may be used in this disclosure.

Weighting agents or density materials suitable for use in this disclosure include galena, hematite, magnetite, iron oxides, illmenite, barite, siderite, celestite, dolomite, calcite, and the like. The quantity of such material added, if any, depends upon the desired density of the final composition. Weighting agents may be added to result in a drilling fluid density of up to about 24 pounds per gallon. The weight material is preferably added up to 21 pounds per gallon and most preferably up to 19.5 pounds per gallon.

Latent Curing Agents

In one or more embodiments, a latent curing agent may be added to the cement compositions of the present disclosure. Latent curing agents present in the cement compositions may include microscale and nanoscale organic or inorganic structures that are capable of sequestering aqueous fluids or other materials that may act to decrease the setting time of the concrete component. In some embodiments, latent curing agents include aqueous fluids encapsulated in an organic coating or contained within an inorganic material that releases stored fluids through passive diffusion into the surrounding media with a slow or rapid release profile. Because the aqueous fluid is sequestered (and unavailable to react with the cement for at least a period of time), a fluid including latent curing agent may still be considered substantially free of accessible water.

In another embodiment, aqueous fluids and curing agents may be released from an organic coating in response to an external stimulus or triggering event, which may include changes in temperature or pH; degradation of the encapsulant by enzymes, oxidants, or solvents; or physical disruption of the encapsulant, such as by grinding or crushing. It is also envisioned that encapsulants susceptible to triggered release may also be used in conjunction with passive diffusion encapsulants, and combined with any of the strategies disclosed above.

In one or more embodiments, the organic coating present on the latent curing source may be prepared from cellulose acetate, cellulose acetate butyrate, ethyl cellulose, hydroxymethyl cellulose, hydroxyethyl cellulose, and the like. Other encapsulants include polystyrene, copolymers of polystyrene with other vinylic monomers, polymethylmethacrylate, copolymers of methylmethacrylate with other ethylenically-unsaturated monomers, acrylic resins, polyolefins, polyamides, polycarbonates, polystyrene, vinyl polymers such as vinyl acetate, vinyl alcohol, vinyl chloride, vinyl butyral, and copolymers, terpolymers, and quaternary polymers thereof. Examples of pH-sensitive polymers include poly(hydroxethyl0)methacrylate-co-methacrylic acid) and a copolymer of N,N,dimethylaminoethyl methacrylate and divinyl benzene.

In other embodiments, latent curing agents may be inorganic molecules or compounds that reversibly trap aqueous materials within a macromolecular structure such as a molecular sieve, hydrated salt, or silica gel. When added to cement compositions of the present disclosure, aqueous fluids trapped within the structure of the latent curing agent are released at a controlled rate. For example, increased temperature may drive trapped aqueous fluids from silica gel, molecular sieves, zeolites, and other materials known in the art. In yet other embodiments, the latent curing agent may be an absorbent polymer that releases trapped water in response to changes temperature or pH.

Applications

In one or more embodiments, cement compositions disclosed herein may be used in any cementing application known in the art including, but not limited to, primary cementing, zonal isolation, cement squeezes, fluid loss pills, and the like. When used in primary cementing operations, cement compositions of the present disclosure may be placed in at least a portion of the annular space between the sidewalls of a wellbore and the exterior of a casing string disposed in the wellbore. The cement composition may then be allowed to solidify therein. The cement composition may be placed in the annular space either before or after a wellbore fluid is placed in the annular space. In some embodiments, a wellbore or annular space within the wellbore may be preflushed or overflushed with an aqueous wellbore fluid such as water, seawater, or brine prior to or following emplacement of the cement forming composition.

Those skilled in the art will appreciate that the disclosed methods and uses may not necessarily be applied throughout the entire length of the subterranean interval being cemented. In such cases, more than one cement composition may be placed sequentially. Those skilled in the art will also appreciate that the disclosed method and use would not only be useful for primary cementing, but also for remedial and other cementing operations such as squeeze cementing, plug cementing, and spot cementing. In such cementing operations, cement compositions may be positioned in the wellbore to minimize fluid loss into the formation, plug a void or crack in wellbore piping, or to repair a cement sheath residing in a wellbore annulus.

In some embodiments, emplacement of the cement composition occurs by pumping the cement composition through the casing string to fill the annular space or by pumping the cement into the desired wellbore region. However, emplacement of the cement composition may or may not involve pumping the cement composition. In some embodiments, placement of the cement composition may be achieved using wireline tools, slickline tools, dump bailers, and other methods and instrumentation well known in the art. Depending on the particular application, a cement formulation of the present disclosure may be directly emplaced into the wellbore by conventional means known in the art into the region of the wellbore in which the cement is desired to cure or set into the composite. In other embodiments, the cement may be emplaced into a wellbore and then displaced into the region of the wellbore in which the cement is desired to set or cure.

According to various embodiments, the formulations of the present disclosure may be used where a casing string or another liner is to be sealed and/or bonded in the annular space between the walls of the borehole and the outer diameter of the casing or liner with composite material of the present disclosure. For example, following drilling of a given interval, once placement of a casing or liner is desired, the drilling fluid may be displaced by a displacement fluid. The drill bit and drill string may be pulled from the well and a casing or liner string may be suspended therein. The present formulation of components may be pumped through the interior of the casing or liner, and following the present fluid formulation, a second displacement fluid (for example, the fluid with which the next interval will be drilled or a fluid similar to the first displacement fluid) may displace the present fluid into the annulus between the casing or liner and borehole wall. Once the cement has cured and set in the annular space, drilling of the next interval may continue. Prior to production, the interior of the casing or liner may be cleaned and perforated, as known in the art of completing a wellbore. In some embodiments, the formulations may be pumped into a selected region of the wellbore needing consolidation, strengthening, etc., and following curing, a central bore may be drilled out.

Further, in embodiments, a casing may be run into the hole having a fluid therein, followed by pumping a sequence of a spacer fluid ahead of a cement formulation according to the present disclosure, after which a displacement fluid may displace the formulation into the annulus. Further embodiments may use both a cementitious slurry and a resin formulation (pumped in either order, cement then resin or resin then cement) and/or multiple volumes of cement and resin, such as cement-resin-cement or resin-cement-resin, with appropriate placement of spacers and/or wiper plugs. When using both cement and a resin formulation, different setting times between the cement and resin formulation may be used so that the resin may be set in compression or the resin may be set while the cement is still fluid.

Wellbore stability may also be enhanced by the injection of the cement formulation into formations along the wellbore. The mixture may then react or continue to react, strengthening the formation along the wellbore upon reaction of the cement with water.

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through a small percentage of the volume of the reservoir, for example, and may thus require an excessive amount of treatment fluid to displace a high percentage of crude oil from a reservoir.

To combat the thief zones or high permeability zones of a formation, embodiments of the cement formulations disclosed herein may be injected into the formation. The cement formulation injected into the formation may react and partially or wholly restrict flow through the highly conductive zones. In this manner, the cement may effectively reduce channeling routes through the formation, forcing the treating fluid through less porous zones, and potentially decreasing the quantity of treating fluid required and increasing the oil recovery from the reservoir.

In other embodiments, the cement of the present disclosure may be formed within the formation to combat the thief zones. The cement formulation may be injected into the formation, allowing the components to penetrate further into the formation than if a water was injected with the formulation. By reacting the cement in situ in the formation, it may be possible to avert channeling that may have otherwise occurred further into the formation, such as where the treatment fluid traverses back to the thief zone soon after bypassing the injected gels as described above.

As another example, embodiments of the cement formulation disclosed herein may be used as a loss circulation material (LCM) treatment when excessive seepage or circulation loss problems are encountered. In such an instance, the cement formulation may be emplaced into the wellbore into the region where excessive fluid loss is occurring and allowed to set. Upon setting, the cement material may optionally be drilled through to continue drilling of the wellbore to total depth.

EXAMPLES

Example 1

Use of Hydration Retarders to Control Set Time and Cement Hardness

Cement compositions were prepared and the effect of various hydration retarders on the cure time and resulting hardness of the final cement was assayed. Sample formulations are shown below in Table 1.

TABLE 1

| Cement formulations for Example 1 | |
|---|---|
| Component | % w/w |
| monopropylene glycol | 67.3 |
| alkane sulfonate surfactant | 0.2 |
| hydrophobic fumed silica | 2 |
| magnesium oxide powder | 30 |
| polyvinylpyrrolidone | 0.5 |
| Calculated SG | 1.34 g/mL |

Cement compositions were prepared by mixing a portion of the concentrate in the following ratio: 100 parts by weight (pbw) of base with 23 pbw of $MgSO_4.7H_2O$. Cement compositions were then mixed with 1% w/w water and agitated for 30 minutes at room temperature. Aliquots of the resulting mixture were then added to 30 mL thick walled glass vials and selected retarders were added to each respective vial at the concentrations indicated in the tables below. The samples were then dynamically aged for 2.5 hours at 40° C., followed by the addition of 2 mL of water and returned to dynamic aging for 30 minutes at 40° C. Next, the samples were statically aged for 18 hours at 50° C. and the hardness of each sample was qualitatively monitored with a needle probe at 1 or 2 hours. If the 17 g needle fell through the sample it was deemed not set. Conversely, if the cement supported the needle, it was deemed set or, if the needle partially penetrated the sample, it was recorded as soft set. Following qualitative analysis, the hardness of the samples was measured quantitatively by texture analyzer after 18 hours at 50° C.

The results in the following tables demonstrate the varying degrees of retarding effect on composition set time. Samples are compared with a control base sample and, in some instances remain liquid and mobile for up to 2 hours after the control sample has set. Hydration retarders assayed include TANNATHIN, POLYPAC™ UL, SPERSENE™, and DUALFLO available from M.I., L.L.C. (Houston, Tex.); BAYPURE™ available from Lanxess, GmbH (Baytown, Tex.); D1834 lignosulfonate available from Borregaard (Atlanta, Ga.).

It was also noted that citric acid had a detrimental effect on the hardness of the sample at 18 hours, and that similar results were observed with polyglycolic acid. However, for a number of samples the hardness of the resulting cement increased. Thus, the examples demonstrate a capacity to control set time with hydration retarders, and also a method by which to improve the hardness of the sample. Increases in cement hardness were observed with two types of lignosulfonate and sodium polyaspartate.

TABLE 1

| | Test Parameters | | Observation at Early Stage | | 18 hr Texture Analyzer Hardness, 4 mm dia. Probe | |
|---|---|---|---|---|---|---|
| Retarder | Description | Conc. (g) | After 2 hr. dynamic aging plus 30 min with 2 mL water | Needle harness after 1 or 2 hrs. | Initial Peak (g) | Max Peak (g) |
| Control | — | N/A | liquid | set at 2 hr. | 5300 | 8000 |
| Poly PAC UL | carboxymethyl cellulose | 0.1 | liquid | set at 2 hr. | 3600 | 8300 |
| | | 0.2 | liquid | set at 2 hr. | 4600 | 8300 |
| | | 0.4 | liquid | set at 2 hr. | 6000 | 9600 |
| DUALFLO | modified starch | 0.1 | liquid | set at 2 hr. | 4500 | 7300 |
| | | 0.2 | liquid | set at 2 hr. | 4000 | 6700 |
| | | 0.4 | highly viscous | set at 2 hr. | 6600 | 7000 |
| — | citric acid | 0.1 | liquid | set at 2 hr. | 5000 | 8600 |
| | | 0.2 | liquid | soft set at 2 hr. | 5200 | 8000 |
| | | 0.4 | liquid | viscous liquid at 2 hr. | 3000 | 4600 |
| — | soda ash | 0.1 | liquid | set at 2 hr. | 4200 | 5900 |
| | | 0.2 | liquid | set at 2 hr. | 4700 | 6300 |
| | | 0.4 | liquid | set at 2 hr. | 5000 | 8000 |

TABLE 2

| | Test Parameters | | Observation at Early Stage | | 18 hr. Texture Analyzer Hardness, 4 mm dia. Probe | |
|---|---|---|---|---|---|---|
| Retarder | Description | Conc. (g) | After 2 hr. dynamic aging plus 30 min with 2 mL water | Needle harness after 1 or 2 hrs. | Initial Peak (g) | Max Peak (g) |
| Control | — | N/A | liquid | set at 1 hr. | 4000 | 7600 |
| — | calcium silicate | 0.1 | liquid | set at 2 hr. | 4500 | 6300 |
| | | 0.2 | liquid | set at 2 hr. | 4300 | 7300 |
| | | 0.4 | liquid | set at 2 hr. | 5700 | 6000 |
| — | polyglycolic acid | 0.1 | liquid | soft set at 1 hr. | 4000 | 7300 |
| | | 0.2 | liquid | soft set at 1 hr. | 1000 | 2700 |
| | | 0.4 | liquid | liquid at 1 hr. | 2000 | 3100 |
| — | sugar | 0.1 | liquid | set at 1 hr. | 3000 | 6000 |
| | | 0.2 | liquid | set at 1 hr. | 3500 | 6600 |
| | | 0.4 | liquid | set at 1 hr. | 3500 | 5700 |
| SPERSENE CF | lignosulfonate | 0.1 | liquid | set at 1 hr. | 6600 | 7700 |
| | | 0.2 | liquid | set at 1 hr. | 7000 | 10600 |
| | | 0.4 | liquid | liquid at 2 hr. | 4600 | 10600 |

TABLE 3

| | | | Observation at Early Stage | | | |
|---|---|---|---|---|---|---|
| Test Parameters | | | After 2 hr. dynamic aging plus | | 18 hr Texture Analyzer Hardness, 4 mm dia. Probe | |
| Retarder | Description | Conc. (g) | 30 min with 2 mL water | Needle harness after 1 or 2 hrs. | Initial Peak (g) | Max Peak (g) |
| Control | — | N/A | liquid | set at 1 hr. | 3400 | 7300 |
| sodium acid pyrophosphate | — | 0.1 | liquid | set at 1 hr. | 3700 | 6600 |
| | | 0.2 | liquid | set at 1 hr. | 3000 | 5000 |
| | | 0.4 | liquid | set at 1 hr. | 3500 | 7000 |
| aluminum sulfate hydrate | — | 0.1 | liquid | set at 1 hr. | 4700 | 9300 |
| | | 0.2 | liquid | set at 1 hr. | 6300 | 8000 |
| | | 0.4 | liquid | set at 1 hr. | 4700 | 10000 |
| BAYPURE DSP | poly-succinimide | 0.1 | liquid | soft set at 1 hr. | 3600 | 7100 |
| | | 0.2 | liquid | soft set at 1 hr. | 3700 | 8750 |
| | | 0.4 | liquid | soft set at 1 hr. | 3800 | 10700 |
| BAYPURE DS100 | sodium polyaspartate | 0.1 | liquid | soft set at 1 hr. | 4700 | 8300 |
| | | 0.2 | liquid | liquid at 1 hr. | 8000 | 10100 |
| | | 0.4 | liquid | liquid at 1 hr. | 13400 | 13400 |

TABLE 4

| | | | Observation at Early Stage | | | |
|---|---|---|---|---|---|---|
| Test Parameters | | | After 2 hr. dynamic aging plus | | 18 hr Texture Analyzer Hardness, 4 mm dia. Probe | |
| Retarder | Description | Conc. (g) | 30 min with 2 mL water | Needle harness after 1 or 2 hrs. | Initial Peak (g) | Max Peak (g) |
| BAYPURE DS100 | sodium polyaspartate | 0.1 | liquid | soft set at 1 hr. | 4700 | 8300 |
| | | 0.2 | liquid | liquid at 1 hr. | 8000 | 10100 |
| | | 0.4 | liquid | liquid at 1 hr. | 13400 | 13400 |
| TANNATHIN | lignite | 0.1 | liquid | set at 1 hr. | 4100 | 6400 |
| | | 0.2 | liquid | set at 1 hr. | 4000 | 6400 |
| | | 0.4 | liquid | set at 1 hr. | 4000 | 7000 |
| COLATAN UNITAN | tannin | 0.1 | liquid | set at 1 hr. | 5000 | 7400 |
| | | 0.2 | liquid | set at 2 hr. | 4900 | 8700 |
| | | 0.4 | liquid | set at 2 hr. | 10000 | 10000 |
| D1834 BORREGAARD | lignosulfonate | 0.1 | liquid | set at 2 hr. | 5500 | 8700 |
| | | 0.2 | liquid | set at 1 hr. | 5500 | 10000 |
| | | 0.4 | liquid | liquid at 1 hr. | 7900 | 13000 |
| BAYPURE CX100 | tetrasodium iminodisuccinate | 0.4 | liquid | liquid at 1 hr. | 5000 | 6100 |

Example 2 A

Set Profile Viscometry

In a second set of experiments, a high measurement range Brookfield viscometer was used an atmospheric consistometer to determine the set profile for hydrating cement compositions. The consistometer setup consisted of the viscometer, a specialist vane spindle adapter, a circulating water bath to control temperature, and a computer to record measurements.

The following test demonstrates that cement compositions in accordance with this disclosure may remain liquid and suitable for use in embodiments in which the composition may be delivered into a downhole environment. In order to simulate water contamination during the mixing and pumping stage of the process, 10% w/w of water was added to the samples at the beginning of the measurement.

The hydration retarding effect demonstrated in Example 1 was confirmed in the set profile tests as demonstrated in FIG. 1. Cement compositions for this sample were prepared using the formulation shown above in Table 1. The addition of magnesium sulfate and lignosulfonate are described in the legend on the chart. As shown in FIG. 1, samples exhibited low viscosity initially as confirmed by negligible torque values under dynamic conditions of stirring at 200 rpm. The control formulation denoted by curve A shows that thickening began around 70 minutes and at approximately 80° C. In contrast, curves B and C for the sample containing D1834 lignosulfonate as a hydration retarder shows a delayed thickening effect at around 100 minutes at a temperature of 93° C., but the thickening is far less pronounced. These results illustrate that hydration retarders may be used to extend the operational window of cement compositions even beyond the 93° C. temperature tested.

Example 2B

High Temperature Set Profile Tests

Figure 2:
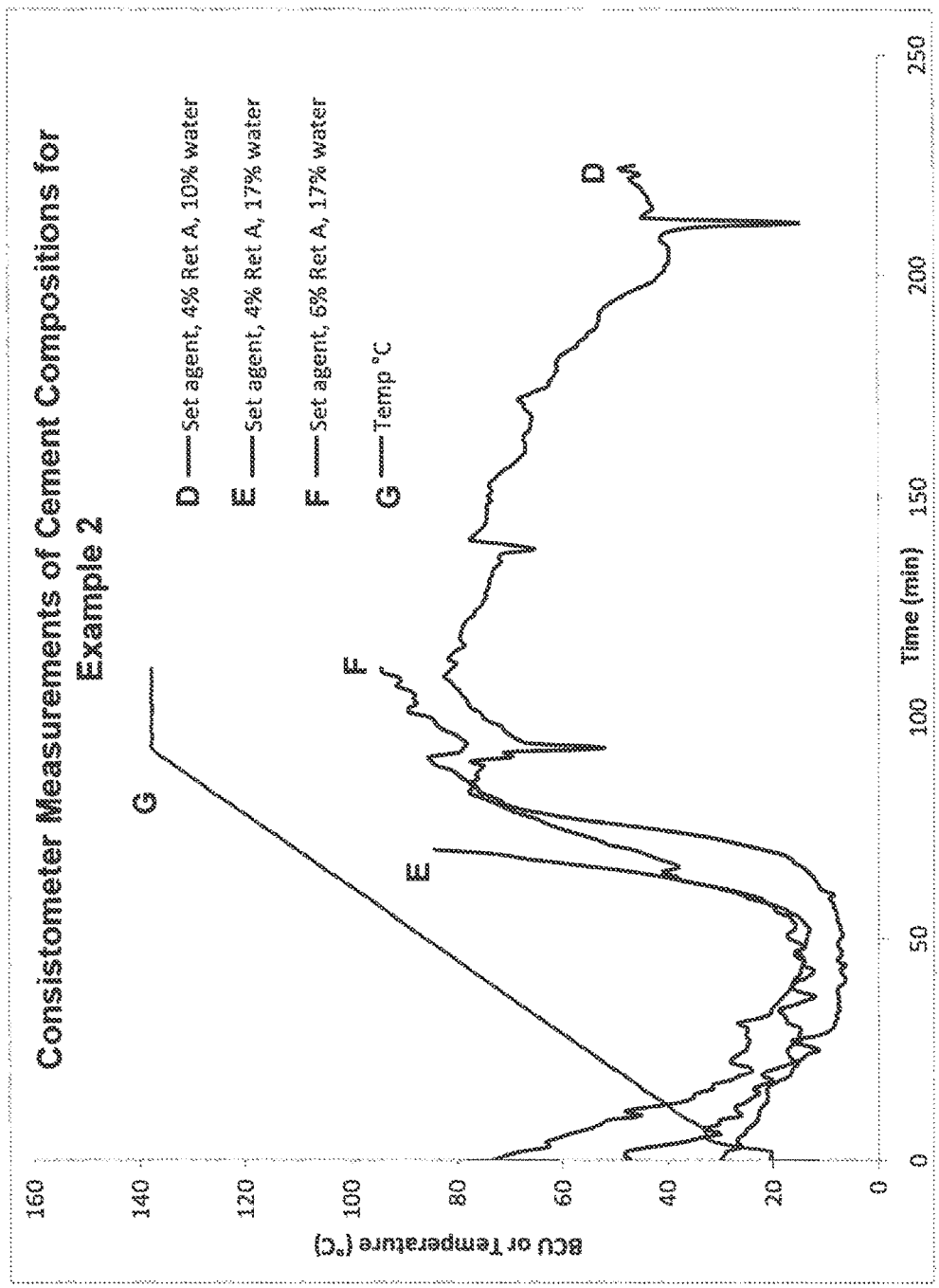
FIG. 2 is an illustration of consistometer tests as a function of applied water and hydration retarder for cement compositions in accordance with embodiments described herein.

Cement compositions were prepared as discussed above in Table 1, and viscosity was monitored in a pressurized Nowsco consistometer cell. The results in FIG. 2 show that Sample D containing 4% w/w of a polyaspartate hydration retarder (Ret A) and 10% w/w water appeared to start setting around 60 minutes and at 95 to 100° C. (~10,000 psi), but did not go to completion, and the sample remained a viscous liquid for up to 230 minutes until the test was stopped. In contrast, Sample E containing 17% w/w water reached a high enough viscosity to complete the test and reach 100 Beardon Units after about 65 minutes. On opening the cell at the end of the test it was noted that Sample E had formed a soft solid. Sample F containing 6% w/w retarder and 17% w/w water shows the hydration retarder introduces a delaying effect and setting did not start until 75 minutes, however, unlike Sample E, the sample remained a viscous liquid when the cell was opened at the end of the test.

This example illustrates that, if cement compositions in accordance with the present disclosure contain 4% retarder and pick up less than 10% water in the pumping stage, the compositions will remain liquid for a substantial period of time at elevated temperatures and pressure. Secondly, if cement compositions downhole encounter sufficient water, such as up to 17% w/w, then the composition will set solid.

Further viscometric and hardness data for the samples are shown in Tables 5 and 6 below.

TABLE 5

Brookfield viscosity of Samples at the end of testing for Example 2B

| Sample | 1 rpm | 4 rpm |
|---|---|---|
| Sample E | 9840 cps | 21,000 cps |
| Sample F | 3600 cps | 13,000 cps |

Samples were taken from either the liquid in the cell after the consistometer test or excess material left over from the start of the test in the case of the Sample E. These were placed in small vials to which water was added to increase the total water content of the samples by an additional 10 or 20% respectively. These were placed in pressurized cells and heated to 140° C. and aged statically. The hardness of the samples was measured after a few hours and ~24 hours. Hardness values for each of the samples are shown below in Table 6.

TABLE 6

Max hardness values of samples aged at 140° C.

| Added Water (w/w) | Sample D Set agent, 4% polyaspartate, 10% water Results after 6 hrs. | Sample E Set agent, 4% polyaspartate, 17% water Results after 2 hrs. | Sample F Set agent, 6% polyaspartate, 17% water Results after 4 hrs. |
|---|---|---|---|
| 0% | Soft paste | 6,600 g | 1,800 g |
| 10% | Soft paste | 10,600 g | 6,000 g |
| 20% | 10,000 g | 9,300 g | 8,300 g |
| | Results after 24 hours | | |
| 0% | 25 g | 16,600 g | 4,300 g |
| 10% | 2600 g | 11,200 g | 5,000 g |
| 20% | 13,200 g | 15,000 g | 21,600 g |

The above hardness results show that water may be important in forming a hard solid. With 4% hydration retarder, the sample may need additional water after the pumping stage to form a firm solid. If extra water is added from the start, as is the case with the samples containing 17%, then the curing rate of the samples may be reduced by some extent.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Moreover, embodiments described herein may be practiced in the absence of any element that is not specifically disclosed herein.

What is claimed:

1. A cement composition consisting essentially of:

a cement component;

an oil-immiscible solvent present in an amount ranging from 10 to 80 vol %, wherein the oil-immiscible solvent is one or more selected from a group consisting of ethylene glycol, propylene glycol, glycerol, diethylene glycol, triethylene glycol, 1,3-butanediol, and hexylene glycol;

a surfactant;

one or more hydration retarders selected from a group consisting of polycarboxylate polymers, polysuccinimide, polycarboxylic acids and polyaspartate; and one or more additives selected from the group consisting of a particulate, one or more ionic polymers, water, one or more non-ionic polymers, and a latent curing agent.

2. The cement composition of claim 1, wherein the cement component comprises a magnesium-based cement.

3. The cement composition of claim 1, wherein the one or more additives comprises the particulate and the particulate is a particulate silica.

4. The cement composition of claim 1, wherein the surfactant is an anionic surfactant.

5. The cement composition of claim 4, wherein the anionic surfactant is one or more selected from a group consisting of alpha olefin sulfonates, fatty acid derivatives, phosphate esters, acetylene diols, and lecithins.

6. The cement composition of claim 1, wherein the one or more additives comprises the one or more ionic polymers.

7. The cement composition of claim 6, wherein the one or more ionic polymers additive is a copolymer or terpolymer comprising at least one of acrylic acid, itaconic acid, maleic acid, acrylamido-2-methyl-propane sulfonic acid, styrene sulfonic acid, and vinyl phosphonic acid.

8. A cement composition consisting essentially of:

a cement component;

an oil-immiscible solvent present in an amount ranging from 10 to 80 vol %, wherein the oil-immiscible solvent is one or more selected from a group consisting of ethylene glycol, propylene glycol, glycerol, diethylene glycol, triethylene glycol, 1,3-butanediol, and hexylene glycol;

a surfactant;

one or more hydration retarders selected from a group consisting of polycarboxylate polymers, polysuccinimide, polycarboxylic acids and polyaspartate;

one or more additives selected from the group consisting of a particulate, one or more ionic polymers, one or more non-ionic polymers and a latent curing agent; and less than 15% by volume of water.

9. A cement composition consisting essentially of:

a cement component;

an oil-immiscible solvent present in an amount ranging from 10 to 80 vol %, wherein the oil-immiscible solvent is one or more selected from a group consisting of ethylene glycol, propylene glycol, glycerol, diethylene glycol, triethylene glycol, 1,3-butanediol, and hexylene glycol;

a surfactant;

one or more hydration retarders selected from a group consisting of polycarboxylate polymers, polysuccinimide, polycarboxylic acids and polyaspartate;

one or more additives selected from the group consisting of a particulate, one or more ionic polymers, water, and a latent curing agent; and one or more non-ionic polymers selected from polyvinylpyrrolidone, polyvinylpyrrolidone copolymers, polyacrylamide, polysuccinimide, polymaleic anhydride, and polymaleic anhydride copolymers.

* * * * *